United States Patent [19]

Krueger

[11] 4,127,895
[45] Nov. 28, 1978

[54] CHARGE-TRANSFER VOLTAGE CONVERTER

[76] Inventor: Paul J. Krueger, 2746 B Socorro Loop, Holloman AFB, N. Mex. 88330

[21] Appl. No.: 826,228

[22] Filed: Aug. 19, 1977

[51] Int. Cl.$^2$ .............................................. H02M 7/00
[52] U.S. Cl. ........................................... 363/86; 320/1; 323/22 T; 363/89; 363/62
[58] Field of Search ................... 307/109, 110; 320/1; 323/22 T; 363/20, 21, 59–62, 86, 89, 125, 126

[56] References Cited

U.S. PATENT DOCUMENTS

| 2,984,779 | 5/1961 | Klees | 363/126 X |
| 3,478,258 | 11/1969 | Nagai | 363/62 |
| 3,611,332 | 10/1971 | Slater | 323/22 T X |
| 3,879,648 | 4/1975 | Hossman, Jr. | 363/62 |
| 3,959,716 | 5/1976 | Gilbert, Jr. et al. | 323/22 T X |

OTHER PUBLICATIONS

*Source Book of Electronic Circuits*, John Markus, McGraw-Hill Book Company, New York, 1968, p. 602.

IBM Technical Disclosure Bulletin, Battery Charger, P. Abramson, vol. 7, No. 6, Nov. 1969.

*Primary Examiner*—William M. Shoop
*Attorney, Agent, or Firm*—Joseph E. Rusz; George Fine

[57] ABSTRACT

A charge-transfer voltage converter transforms a high voltage to a lower value without the use of a conventional transformer. Two capacitors are connected together to form an electrical circuit. The circuit is then broken in one place and a switch is inserted to form a continuous circuit. One of the two capacitors is charged to a high voltage. The switch is turned on and off rapidly and this transfers a charge from the charged capacitor to one which was initially uncharged. By controlling the duty cycle and/or repetition rate of the switch between the two capacitors, the output voltage of the capacitor which was initially uncharged can be maintained between the limits of zero volts and the value to which the supplying capacitor was initially charged. Thus, voltage transformation has been achieved without the use of a conventional transformer.

3 Claims, 1 Drawing Figure

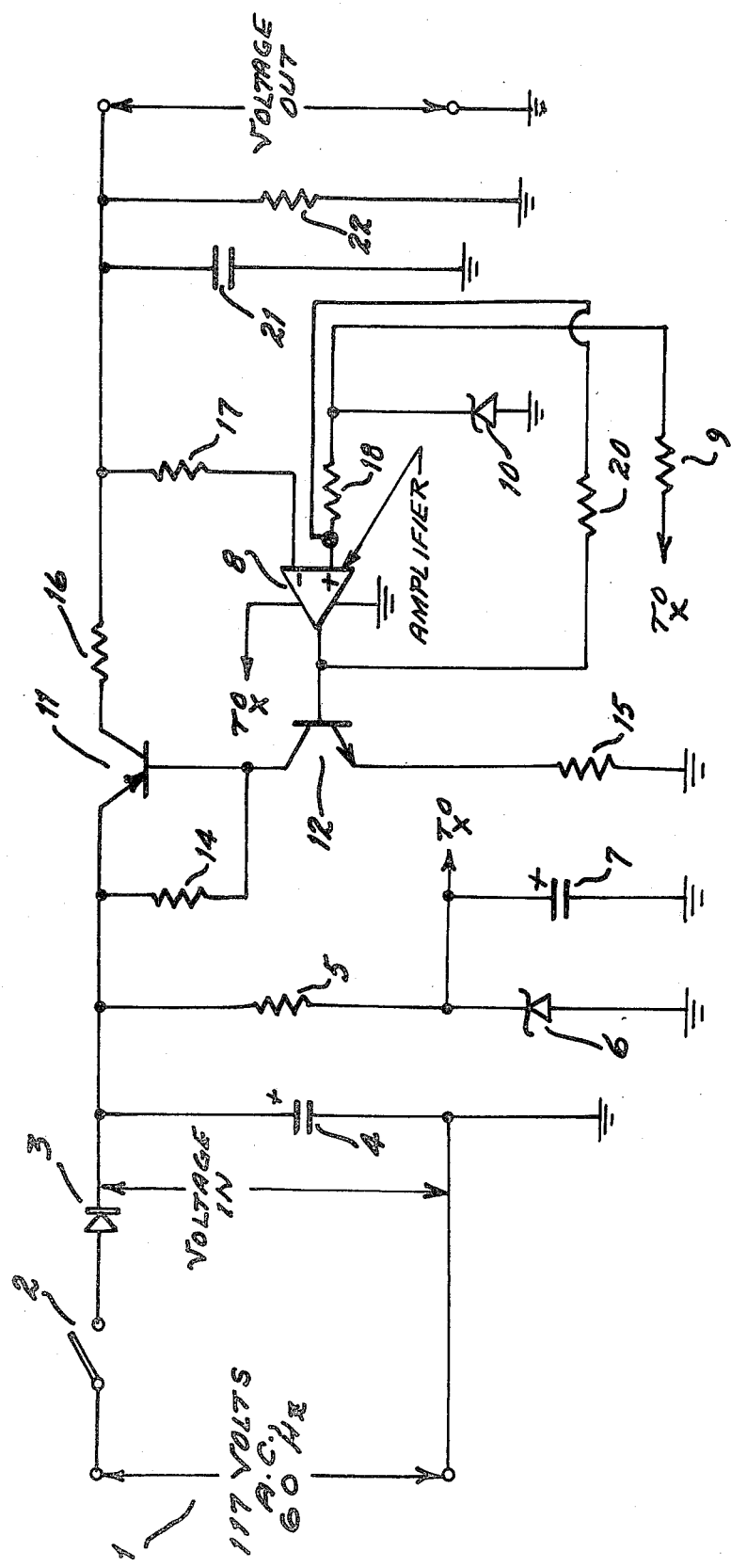

CHARGE-TRANSFER VOLTAGE CONVERTER

STATEMENT OF GOVERNMENT INTEREST

The invention described herein may be manufactured and used by or for the Government for governmental purposes without the payment of any royalty thereon.

BACKGROUND OF THE INVENTION

In the prior art, one of the methods used to transform a high voltage to a lower voltage was the utilization of transformers. This method introduced weight limitations and decreased efficiency. It also resulted in greater space requirements. A further limitation was the higher cost. The present invention eliminates the need for transformers and provides a unique apparatus for voltage transformation without the prior art limitations. It may utilize a unipolar alternating current source or a direct current source. It is compact and light in weight while handling appreciable amounts of power. It provides excellent line and load regulation. Finally, it increases efficiency, saves weight and space, reduces voltage transients, and saves money when used in place of conventional transformers.

SUMMARY OF THE INVENTION

A charge-transfer voltage converter is provided whereby a high voltage is transformed to a lower value. There are utilized two capacitors connected together by a switch. The switch may be a mechanical one, but it is preferable that it be a semiconductor designed and manufactured for the purpose of switching electrical currents (i.e., powertransistor, power thyristor, gate-turn-off silicon-controlled rectifier, etc.). The two capacitors are then connected together to form an electrical circuit. The circuit is broken in one place and the switch is inserted again to form a continuous circuit (when the switch is in its closed position). Next, one of the two capacitors is charged to a high voltage. Then the switch may be turned rapidly on and off and this process transfers the electronic charge from the charged capacitor to the one which was initially uncharged. By precisely controlling the duty cycle and/or repetition rate of the series switch between the two capacitors, the output voltage of the capacitor which was initially uncharged can be maintained between the limits of zero volts and the value to which the supplying capacitor was initially charged. Thus, voltage transformation has been achieved without the use of a conventional transformer.

DESCRIPTION OF THE DRAWINGS

In the single FIGURE of the preferred embodiment there is shown in schematic diagram form the charge-transfer voltage converter of the present invention.

DETAILED DESCRIPTION OF THE PREFERRED EMBODIMENT

Now referring in detail to the single FIGURE, the prime power source for this example is ordinary 117 VAC, 60 hertz, line current at input 1. Switch 2 is the on/off switch for the circuit; when it is closed, rectifier diode 3 conducts current on the alternate positive half-cycles of the line voltage and charges the capacitor 4 to voltage (Vin). Resistor 5 in series with Zener diode 6 and shunt capacitor form an auxiliary regulated power supply to operate voltage comparator amplifier 8 and reference voltage source consisting of resistor 9 and Zener diode 10. Transistor 11 acts as a solid state "switch". It is turned on (saturated) or off (cut off) by transistor 12 which acts as its driver. Resistor 14 serves to keep transistor 11 in a nonconducting state when transistor 12 is nonconducting. Resistor 15 limits the conduction current of transistor 12 to a safe level. Amplifier 8 is a voltage comparator operating with positive feedback and hysteresis established by resistors 17, 18, and 20. Capacitor 21 stores the energy which will be supplied to the load resistor 22 at the desired output potential (Vout).

In operation, the energy stored in a capacitor is equivalent to the product of one-half of its capacitance times the square of the voltage to which it has been charged (i.e., $E = \frac{1}{2} CV^2$). If Vout is less than Vin, and the capacitance of capacitors 4 and 21 are equal, the energy stored in capacitor 21 will be much less than that stored in capacitor 4 because of the effect the voltage-squared term has in the energy storage equation. The charge-transfer-voltage converter uses this principle. Capacitor 4 when charged to Vin contains much more energy than capacitor 21 charged to voltage Vout. Thus, energy may be transferred in "packets" from capacitor 4 to 21 via transistor switch 11 to establish and maintain the voltage Vout, with negligible effect on the value on Vin. In practice, capacitor 21 may have a considerably greater value than capacitor 4 without adversely affecting operation of the circuit. Comparator amplifier 8 compares the value of Vref with the value of Vout. If Vref is greater than Vout, the amplifier switches and turns transistor 12 on which in turn turns transistor 11 on and capacitor 21 is charged until the value of Vout exceeds the value of Vref. When this occurs, amplifier 8 again switches and turns transistors 12 and 11 off. As load resistor 22 discharges capacitor 21, Vout again falls below the value of Vref and the cycle repeats. The resistors 17, 18 and 20 may be sized to provide hysteresis about the value of Vout, thereby decreasing the frequency of switching action and increasing circuit efficiency.

What is claimed is:

1. A charge-transfer voltage converter comprised of a prime power source supplying a rectifier receiving said line current, said rectifier conducting on alternate a positive half-cycles, a first capacitor initially uncharged and of a preselected value connected to said rectifier, said first capacitor being charged thereby, a Zener diode, a shunt capacitor for said Zener diode, a first resistor in series with said Zener diode, said resistor receiving an output from said rectifier, said first resistor, Zener diode and shunt capacitor forming an auxiliary regulated power supply, a voltage comparator having a positive feedback and a resistance voltage divider network adapted to provide hysteresis about a set output voltage value, said voltage comparator being operated by said auxiliary regulated power supply, a reference voltage source also supplying said voltage comparator, an electronic switch, a transistor turning on and off said electronic switch at predetermined intervals by acting as a driver thereof, said transistor being connected to said voltage comparator and to said rectifier, and a second capacitor of the same value as said first capacitor and initially uncharged, said electronic switch delivering an output to said second capacitor only upon the closing thereof to provide an output from said second capacitor.

2. A charge-transfer voltage converter as described in claim 1 further including a second resistor connected across said second capacitor.

3. A charge-transfer voltage converter comprising
a prime power source,
a rectifier and a first capacitor connected in series between said power source and ground,
a first transistor switch having its emitter connected to said rectifier and its collector connected through a first resistor to an output terminal,
a second resistor and a first Zener diode connected in series between the emitter of said first transistor switch and ground, the junction of said second resistor and said Zener diode being connected to the system power supply and through a second capacitor to ground,
a second transistor switch having its collector connected to the base of said first transistor switch and its emitter connected through a third resistor to ground,
a fourth resistor connected between the emitter of said first transistor switch and the collector of said second transistor switch,
a differential amplifier voltage comparator having its output connected to the base of said second transistor switch,
a fifth resistor connected between a first input of said voltage comparator and said output terminal,
a sixth resistor and a second Zener diode connected in series between a second input of said voltage comparator and ground,
a seventh resistor connected between the system power supply and the junction of said sixth resistor and said second Zener diode,
an eighth resistor connected between the output and the second input of said voltage comparator, and
a third capacitor and a ninth resistor connected in parallel between said output terminal and ground.

* * * * *